United States Patent [19]

Voigt et al.

[11] 4,415,485

[45] Nov. 15, 1983

[54] PROCESS FOR THE INTERNAL COATING OF CONTACT TUBES

[75] Inventors: Carl Voigt, Rodenbach; Peter Kleinschmit, Hanau; Reinhard Manner, Maintal, all of Fed. Rep. of Germany

[73] Assignee: Degussa Aktiengesellschaft, Frankfurt, Fed. Rep. of Germany

[21] Appl. No.: 300,298

[22] Filed: Sep. 8, 1981

[30] Foreign Application Priority Data

Sep. 17, 1980 [DE] Fed. Rep. of Germany ....... 3034957

[51] Int. Cl.[3] ............ B01J 35/02

[52] U.S. Cl. ............ 502/100

[58] Field of Search ............ 252/477 R; 423/376; 427/230

[56] References Cited

U.S. PATENT DOCUMENTS

| | | | |
|---|---|---|---|
| 2,768,876 | 10/1956 | Wagner | 423/376 |
| 3,107,146 | 10/1963 | Sasaki | 423/376 |
| 3,112,215 | 11/1963 | Ruosch et al. | 423/376 |

FOREIGN PATENT DOCUMENTS

| | | |
|---|---|---|
| 562136 | 10/1932 | Fed. Rep. of Germany . |
| 919768 | 7/1949 | Fed. Rep. of Germany . |
| 1029063 | 4/1958 | Fed. Rep. of Germany . |
| 2214589 | 10/1973 | Fed. Rep. of Germany . |

OTHER PUBLICATIONS

Ullmann Enzyklopadie der technischen Chemie, vol. 3, 4th edition, 1973, pp. 474 et. seq.

*Primary Examiner*—W. J. Shine
*Attorney, Agent, or Firm*—Cushman, Darby & Cushman

[57] ABSTRACT

The previously carried out internal coating of contact tubes not only required very much manual labor and was very time consuming, but it was also unsatisfactory in regard to adhesion of the contact liquid to the surface and homogenity of the catalyst. By the simultaneous action of heat on the liquid interface in the tubes during the lowering of the liquid level as well as by a specially suited apparatus for this purpose which operates according to the principle of communicating tubes there is provided the possibility of a good adhesion to the surface as well as the formation of a homogeneous layer at very little operating expense.

12 Claims, 1 Drawing Figure

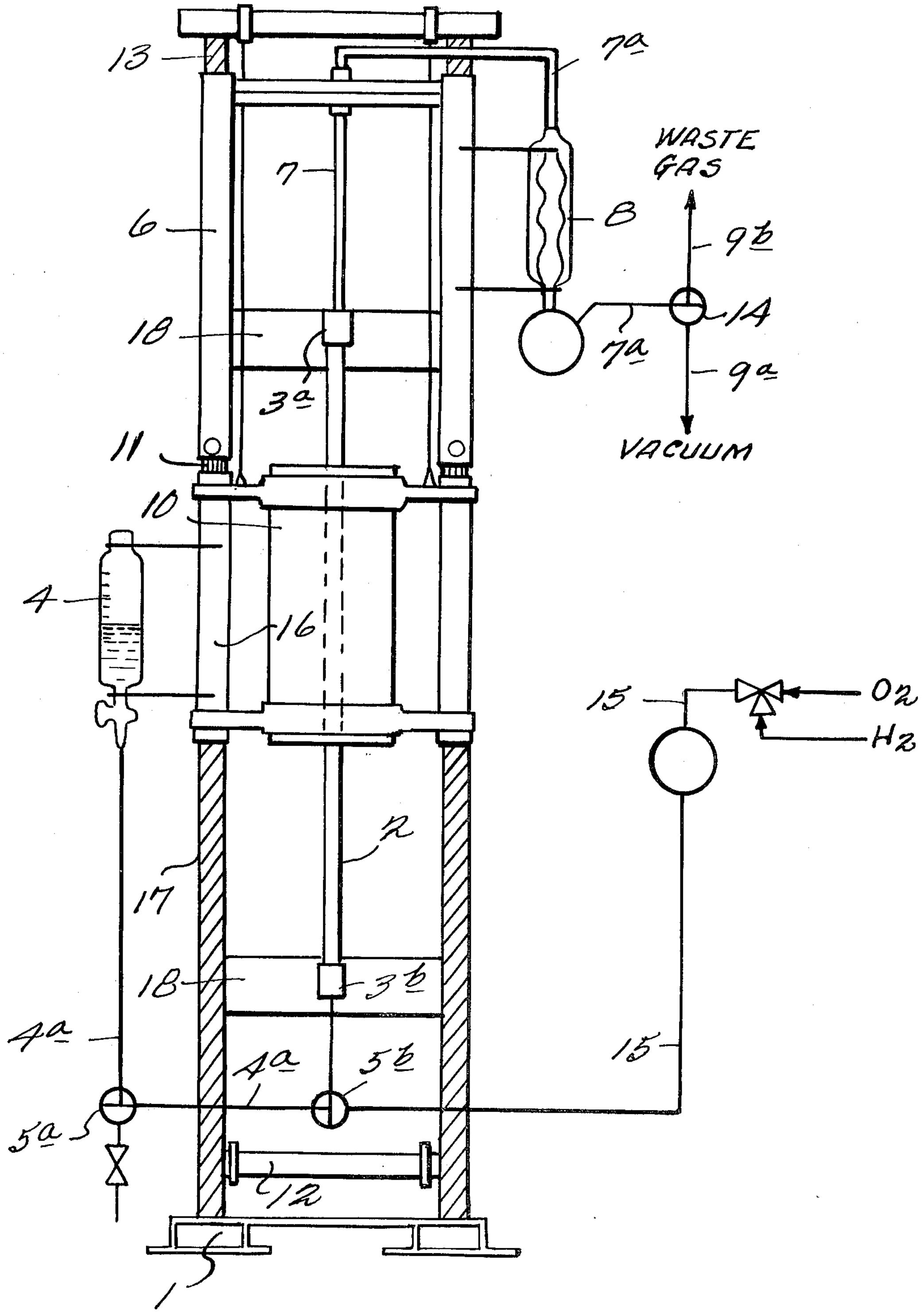
13
7a
7
WASTE GAS
6
8
9b
18
14
7a
3a
9a
11
VACUUM
10
4
16
15
O2
H2
2
17
18
3b
4a
15
4a
5b
5a
12
1

PROCESS FOR THE INTERNAL COATING OF CONTACT TUBES

BACKGROUND OF THE INVENTION

The impregnation of porous bodies with the catalytic material plays an important roll in the various processes for the production of catalysts.

These materials are frequently present in the form of solutions or suspensions but also can be present in melted form, which materials then must be applied to the porous carrier.

Besides natural materials such as pumice, kieselguhr, asbestos, kaolin, and magnesia, there are now used above all synthetic materials such as, e.g. activated carbon, silica gel, silicates, zeolites, various metals, and metal oxides and even carbides and nitrides.

Such processes, however, can no longer be carried out if the contact carrier is present in the form of tubes which should be coated internally. Thus for example, in the so-called BMA process for the production of hydrocyanic acid, the contact is prepared according to the method described in German Pat. No. 919,768.

In spite of the good distribution of the catalyst liquid through oscillations and turnings of the contact tube, see the example in the above-mentioned patent, the production of a homogeneous internal layer continuously presents great difficulties since the surface of the porous body naturally is not so homogeneous that no cavities or raised portions occur and therewith there is impaired the adhesion of the catalyst on the contact. Through these nonuniformities the distribution of the catalyst and therewith its effect inside the tube differ, entirely apart from the fact that the coating itself is very consumptive of work and time.

The object of the present process is to prepare an internal coating of contact tubes with catalyst that requires the least possible manual labor and solves the above-described problem in a simple manner.

SUMMARY OF THE INVENTION

It has now been found that this object can be attained by filling one or more substantially vertical contact tubes with the material to be applied in flowable form, whereupon heat is allowed to act on the liquid interface in the tube or tubes simultaneously with the lowering of the liquid level in the contact tubes, in a given case the waste gas formed by vaporization removed, and in a given case the thus internally coated tubes further treated by oxidation, reduction or shaping.

The method of filling the contact tubes with the material being applied, which is present in flowable form, or the method of lowering the liquid level in the contact tubes of itself can be carried out at pleasure.

Especially simple to carry out is the process according to the principle of communicating tubes in which at least one vessel which contains the material to be applied is connected with the contact tubes at the bottom.

As already stated, it is essential that at the moment of the lowering of the liquid level in the tube or tubes, heat acts on the liquid interface.

Although the type of heat action on the liquid interface in the tubes can be chosen at will, e.g. by radiation or convection, it has proven especially suitable, however, to use a device in which the tube or tubes are located in a vertical moveable furnace and the lowering of the level and the furnace motion proceed in parallel.

If the level vessel then is directly connected with the furnace in any form and its movement takes place then it is particularly simple to hold the liquid level during the coating process at a constant filling height looked at from the furnace and therewith in a well defined manner to allow heat to act on the liquid interface.

BRIEF DESCRIPTION OF THE DRAWING

The single FIGURE of the drawing shows an apparatus which can be used in the invention.

DETAILED DESCRIPTION

The apparatus for carrying out the especially preferred process just mentioned consists of a support 1 which consists of two vertical guide rails or guide tubes 17 which are arranged parallel to each other and are joined together by two bridging pieces 18 in the lower and upper parts of the support 1 and on which the contact tube or tubes 2 are detachably secured, a furnace 10 which is arranged slidably up and down on the guides 17 with the help of slide tubes 16 and which surrounds the contact tubes 2, at least one level vessel 4 for the material to be applied, which level vessel is connected to the furnace 10 directly or via at least one sliding tube 16 and with which the contact tube or tubes 2 are connected in the form of communicating tubes, a vacuum apparatus, preferably in the form of a carrier support 6 which likewise moves slidingly on the guides or tubes 17 and is arranged above the furnace 10 and on whose upper end is held per contact tube 2 an immersing inner tube 7 lowerable into each contact tube 7 as well as in a given case a waste gas line *7a* in which in a given case there is intermediately connected a separating apparatus 8.

There can be used various materials for the vertically arranged contact tubes 2 as for example, metals, e.g. steel or aluminum, metalloid oxides, e.g. silica, carbides, e.g. boron carbide, nitrides, e.g. boron nitride, or natural or synthetic minerals, e.g. alumina.

The contact tubes 2 furthermore can be present in different lengths as well as inner and outer diameters and can have a smooth inner and outer surface or can be structured, see also Achema-Yearbook 1979.

The above-described, preferred vacuum apparatus can, e.g. then be eliminated if there are employed as solvents for the catalyst readily volatile components as e.g. lower molecular weight organic solvents such as short chain aliphatic alcohols, e.g. alkanols such as methanol, ethanol, isopropanol, propanol, butanol, ethers, e.g diethyl ether, dibutyl ether, halohydrocarbons, e.g. 1,2-dichloroethane, 2,2-dichloroethane, chloroform, etc.

In using these solvents the gases can be sucked off directly via line *7a,* e.g. with the help of an applied vacuum.

In those cases in which solvent recovery is eliminated and only waste gas is formed which does not damage the environment, the separating apparatus 8 can be eliminated.

As the heating furnace 10 there can be used all commercial furnaces with which a well fixed temperature can be established and which heat up and cool down sufficiently quickly such as e.g. the thermal pipe heaters or microwave ovens.

The inner tube 7 used in the preferred form of the vacuum apparatus on the carrier support 6 consists of a material such as e.g. stainless steel, ceramic, or glass which is inert to the materials employed or formed.

The separatory apparatus 8 in the simplest case consists of a customary condenser with receiver. However, there can also be used all other known separatory apparatuses.

The process of the invention in its preferred form is carried out with the apparatus of the invention as follows, (see the drawings), i.e. with a carrier support 6, an inner tube 7, and the separatory apparatus 8.

First the furnace 10 is driven up to the upper end of the contact tube or tubes 2 and heated up to the desired temperature.

After filling the level vessel 4 with the material to be applied to the interior of the contact tube or tubes in flowable form, which material is present as solution, dispersion, or suspension and opening the shutoff device, e.g. the valves 5*a* and 5*b*, the liquid flows via the line 4*a* into the inside of the contact tube or tubes 2 until it is even with the level in vessel 4.

After equalization of the liquid level the furnace 10 is moved downwardly with a fixed speed which depends on the type of contact tube, the viscosity of the liquid being applied and the temperature until it preferably has reached the lower contact tube support 3*b*.

(It should be understood that the downward movement can also be stopped before reaching the support 3*b*).

The liquid level in contact tube 2 falls with the downward movement of the furnace 10 and simultaneously the contact is deposited on the inner wall of the contact tube through vaporization of the solvent.

The temperature of the furnace 10 must be so adjusted according to the type of solvent, the desired layer thickness, and the furnace speed that sufficient solvent can be vaporized, i.e. that the material present in solution or as a suspension or dispersion is fixedly deposited on the inner wall. However, a boiling of the liquid should be avoided in order to obtain as homogeneous a layer as possible.

The thickness of the dried contact layer in addition is dependent on the temperature prevailing in the furnace 10 and therewith in the contact tube or tubes 2, the speed of lowering the furnace 10, the height of the liquid level within the tube 2 in the furnace 10 which is adjustable via the level vessel 4 and the type and concentration of liquid used.

It is generally true that the higher the temperature in contact tube 2 and the lower the speed of lowering the furnace 10, the greater the thickness of the layer (coating) of the dried contact formed at a given type and density of liquid.

By diluting the liquid with solvent or suspension agent there are generally produced thinner contact layers at a given temperature in contact 2 and at a given speed of lowering the furnace 10.

The influence of the given parameters on the desired layer thickness must be ascertained in each case in preliminary experiments.

The vaporizing liquid during the applying of the material is suctioned off from the inner tube 7, which is immersed in the contact tube 2 but not in the liquid and is conveyed via line 7*a* to the separatory apparatus 8.

The phase remaining over the condensate in the separatory apparatus 8 is drawn off via the three way valve 14 either via line 9*a* with the help of a vacuum and after customary methods of working up is used again or is directly removed via the waste gas line 9*b*.

The condensate from the separatory apparatus 8 can be brought back into a solvent collector container (not shown) and used again.

After the furnace 10 has ended its downward motion and the liquid has flowed back via the valves 5*a* and 5*b* in the level vessel or is drawn off via valve 5*a*, valve 5*b* is closed.

The actual drying process for the coating of the interior of the contact tube or tubes 2 therewith is ended.

In many cases the preparation of the catalyst is finished by applying to the material a further treatment method such as reduction, oxidation, forming through which the catalyst for the first time has the desired form.

This further treatment of the dried material is preferably carried out in the apparatus of the invention although it also can be carried out separately therefrom. For a direct further treatment of the dried material the tube or tubes 2 are pressurized via line 15 and valve 5*b* with the gas in question, e.g. with $H_2$ or with $O_2$ and the treatment temperature required with the help of the upwardly and downwardly moved furnace 10.

The inner tube 7 in this operating phase in most cases need not be moved as well. The carrier support 6 therefore is shifted to the upper point 13 and secured with the help of e.g. stop screws 11.

If there are formed combustible explosive or toxic gases in the drying process, the inner tube 7, after the end of the drying process, is securely closed against the contact tube 2, e.g. by the stuffing box 3*a* and the gases eliminated via the line 7*a*.

The drying process with the connected treatment of the catalyst on the inside of the contact tube, in case it is necessary, can be repeated one or more times.

(Number 12 indicates the driving motor or its shaft).

The apparatus of the invention is suited for all kinds of inner coating of tubes.

For example, through its use there is made very much easier the inner coating of contact tubes with a layer of nickel or nickel-aluminum oxide for the catalyst production of protective gas from ammonia.

The process of the invention as well as the apparatus of the invention is especially suited for the production of contact tubes for the synthesis of hydrocyanic acid according to the so-called BMA process (hydrocyanic acid-methane-ammonia process) as well as for all processes which are particularly favorably carried out in tube or tube bundle apparatuses (tube reactors), see Ullmann, Enzyklopadie der technischen Chemie, Vol. 3, 4th edition, 1973, pages 474 et seq.

There result great technical simplifications especially for the above-mentioned production of hydrocyanic acid.

The industrial advantage in using the process or apparatus of the invention is first, as already stated above, in the technical simplification for the production of internally coated tubes, since there are formed very homogeneous and very good adhering coatings.

The coatings producible with the process of the invention are so homogeneous since their coating thickness is determined directly by the speed of lowering of the furnace, its temperature and height of the liquid in the tube or tubes located in the furnace.

Furthermore with the process of the invention there result previously unknown possibilities of the inner coating itself as, e.g. coating profiles which are obtained by changed furnace temperature and lowered speed of the furnace, as, e.g. the production of contact tubes which carry the primary amount of catalyst in the primary reaction zone of a reactor by which in the reaction a higher thermal and mechanical load is counteracted, for this also see Example 3.

Besides contact tubes can be coated which at any desired place have catalyst-free zones, i.e. the catalyst layer is located only where it is absolutely necessary.

Also it is possible to coat internally structured contact tubes which favorably influence the flow pattern with the subsequent catalysis, e.g. by coating internally ribbed tubes with catalysts.

Finally, there are producible tubes with different contacts in specific regions of the tube, several zone catalysis, see Example 4.

The production of the so-called multielement catalysts can take place either by multiple coatings with different contact solutions or by one or repeated coatings with a contact mixture.

Since the liquid is applied in warm condition to the inner surface of the tube there can be avoided the stopping of pores by gas particles.

Finally, the drying and post treatment time are greatly shortened and besides it is possible to automatically coat with the apparatus of the invention without doing anything further.

Unless otherwise indicated all parts and percentages are by weight.

The process can comprise, consist essentially of, or consist of the steps set forth with the stated materials and the apparatuses can comprise, consist essentially of, or consist of the stated elements.

The invention will be explained in more detail in the following examples.

EXAMPLE 1

An $Al_2O_3$ contact tube having a length of 210 cm and an inner diameter of about 15 mm was filled from below with a platinum solution with the help of the level vessel in such manner that the liquid level stood at about 10 cm above the bottom edge of the furnace and was shut off with the upper end of the contact tube. The furnace was brought to 250° C. and lowered with a speed of about 8 cm/min.

After about 25 minutes the drying on the surface was ended and the platinum compound dried on the wall was either reduced directly on the support or in a separate furnace in a hydrogen stream at 600°-1000° C. Starting with a hydrochloric acid hexachloroplatinate solution in a concentration of about 75 grams Pt/1 there was applied in a single drying on process about 0.5 gram of platinum in an extremely homogeneous layer. After the reduction step the drying on process can be repeated.

EXAMPLE 2

The procedure was analogous to Example 1 but in place of the platinum solution there was employed a solution of ammonium heptamolybdate $(NH_4)_6Mo_7O_{24}.4H_2O$ (concentration 0.122 gMo/cm$^3$). After the end of the drying on process the tube was calcined in an airstream at 500° C. for 4 hours. In the drying on step there were homogeneously applied about 1.8 grams of the molybdenum compound.

EXAMPLE 3

To produce a coating profile the procedure was analogous to that in Example 1 except that the furnace was not lowered uniformly but instead was lowered at different speeds, beginning at the top with 8 cm/min, which then was increased every 20 cm about 2 cm/min. Purely optically there appeared a constant metal surface but analyticlly there was ascertained a variable coating between 1.2 mg/Pt and 5.2 mg/Pt per surface unit.

EXAMPLE 4

For the production of a contact tube having a two zone contact there was first coated the upper third of the contact tube with the catalyst solution (I) in which the furnace was only conveyed downwardly up to the desired contact limit. Subsequently, the catalyst solution (I) was drawn off and the remainder of the tube section coated with contact solution (II), i.e. from the contact limit to the lower end of the tube.

In the above example catalyst solution (I) consists of an iridium/platinum solution (4 moles Pt, 1 mole Ir), the catalyst solution (II) consists of pure platinum cations.

The solutions were produced starting from hexachloro-iridium acid-6-hydrate (38.5% Ir) and hexachloroplatinate (see Example 1).

What is claimed is:

1. A process for the internal coating of a contact tube with at least one catalyst comprising filling a substantially vertical contact tube with catalyst material to be applied in flowable form, then simultaneously lowering the level of the liquid level in the contact tube and heating the liquid boundary surface in the tube.

2. A process according to claim 1 comprising removing the gases formed.

3. A process according to claim 2 including a further treatment of the internal surface of the coated tube by oxidation or reduction.

4. A process according to claim 3 wherein the further treatment includes oxidation.

5. A process according to claim 3 wherein the further treatment includes reduction.

6. A process according to claim 1 carried out with a movable furnace and a level vessel containing the flowable material, said process comprising heating the liquid boundary surface in the tube while moving the furnace downwardly at the same speed that the level vessel containing the flowable material moves.

7. A process according to claim 6 comprising applying the material in the form of a solution, suspension, or dispersion.

8. A process according to claim 1 comprising applying the material in the form of a solution, suspension, or dispersion.

9. A process according to claim 8 comprising filling the contact tube with the material to be applied using the principle of communicating tubes containing a liquid.

10. A process according to claim 7 comprising filling the contact tube with the material to be applied using the principles of communicating tubes containing a liquid.

11. A process according to claim 6 comprising filling the contact tube with the material to be applied using the principles of communicating tubes containing a liquid.

12. A process according to claim 1 comprising filling the contact tube with the material to be applied using the principles of communicating tubes containing a liquid.

* * * * *